US010739233B2

(12) United States Patent
Brostmeyer et al.

(10) Patent No.: US 10,739,233 B2
(45) Date of Patent: Aug. 11, 2020

(54) CAES COMBUSTOR TEST FACILITY

(71) Applicant: Florida Turbine Technologies, Inc., Jupiter, FL (US)

(72) Inventors: Joseph D. Brostmeyer, Jupiter, FL (US); Russell B. Jones, North Palm Beach, FL (US); James P. Downs, Hobe Sound, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 81 days.

(21) Appl. No.: 15/764,910

(22) PCT Filed: Sep. 26, 2016

(86) PCT No.: PCT/US2016/053694
§ 371 (c)(1),
(2) Date: Mar. 30, 2018

(87) PCT Pub. No.: WO2017/058709
PCT Pub. Date: Apr. 6, 2017

(65) Prior Publication Data
US 2019/0041293 A1    Feb. 7, 2019

Related U.S. Application Data

(60) Provisional application No. 62/234,807, filed on Sep. 30, 2015.

(51) Int. Cl.
*G01M 15/14*    (2006.01)
(52) U.S. Cl.
CPC .................................. *G01M 15/14* (2013.01)
(58) Field of Classification Search
CPC ..................................................... G01M 15/14
(Continued)

(56) References Cited

U.S. PATENT DOCUMENTS 7,770,376 B1 *  8/2010  Brostmeyer ............ F01K 23/10
                                                          60/39.17
7,966,868 B1    6/2011  Sonnichsen et al.
(Continued)

FOREIGN PATENT DOCUMENTS

AU       2012237974 B2    10/2012
CN        202119625 U      1/2012
(Continued)

OTHER PUBLICATIONS

International Search Report and Written Opinion dated Dec. 5, 2016, for corresponding International Application No. PCT/US2016/053694; International Filing Date: Sep. 26, 2016 consisting of 11-pages.
(Continued)

*Primary Examiner* — Eric S. McCall
(74) *Attorney, Agent, or Firm* — Christopher & Weisberg, P.A.

(57) ABSTRACT

A system and method for testing a combustor or other component of a large industrial gas turbine engine. A test facility for testing a gas turbine engine component includes a storage reservoir, a heat exchanger (13) with a first fluid flow passage connected to the storage reservoir and a second fluid flow passage, a combustor (18) connected to the second fluid flow passage of the heat exchanger (13), a hot gas stream from the combustor flowing within the second fluid flow passage, and a test component of a gas turbine engine connected to the second fluid flow passage of the heat exchanger (13). The compressed air from the storage reservoir (11) passes through the heat exchanger (13) first fluid flow passage and is preheated from the hot gas stream passing through the second fluid flow passage, and the preheated compressed air from the heat exchanger (13) passes into the test component for testing.

16 Claims, 8 Drawing Sheets

(58) Field of Classification Search
USPC .................................................... 73/112.01
See application file for complete search history.

(56) References Cited

U.S. PATENT DOCUMENTS

| | | | |
|---|---|---|---|
| 8,205,456 B1 | 6/2012 | Brostmeyer | |
| 2002/0134085 A1 | 9/2002 | Frutschi | |
| 2006/0225428 A1* | 10/2006 | Brostmeyer | F01K 23/103 60/772 |

FOREIGN PATENT DOCUMENTS

| | | |
|---|---|---|
| CN | 202133550 U | 2/2012 |
| CN | 202709822 U | 1/2013 |
| CN | 103597333 A | 2/2014 |
| CN | 203810973 U | 9/2014 |
| GB | 905109 | 9/1962 |
| WO | 2012134824 A1 | 10/2010 |
| WO | 2015057288 A1 | 4/2015 |

OTHER PUBLICATIONS

Office Action dated Feb. 8, 2019 for corresponding European Application No. 16779262.1 filed on Apr. 30, 2018; consisting of 5-pages.
Office Action dated Jul. 24, 2019 for corresponding European Application No. 16779262.1 filed on Apr. 30, 2018; consisting of 5-pages.
Office Action dated Jun. 27, 2019 for corresponding Chinese Application No. 201680069755.4 filed May 29, 2018 consisting of 8-pages.

* cited by examiner

CAES COMBUSTOR TEST FACILITY

CROSS-REFERENCE TO RELATED APPLICATIONS

This application is a Submission under 35 U.S.C. § 371 for U.S. National Stage Patent Application of, and claims priority to, International Application Number PCT/US2016/053694, entitled CAES COMBUSTOR TEST FACILITY, filed Sep. 26, 2016, which is related to and claims priority to U.S. Provisional Patent Application No. 62/234,807, entitled CAES COMBUSTOR TEST FACILITY, filed Sep. 30, 2015, now expired, the entirety of both of which is incorporated herein by reference.

GOVERNMENT LICENSE RIGHTS

None.

TECHNICAL FIELD

The present invention relates generally to a gas turbine engine, and more specifically to an apparatus and a process for testing a combustor or other component of a large industrial gas turbine engine.

BACKGROUND

A large frame heavy duty industrial gas turbine (IGT) engine is typically used to drive an electric generator and produce electrical energy. These engines can produce over 200 MW of electric power. An IGT engine will have a compressor with multiple rows or stages of rotor blades and stator vanes, a combustor with multiple can combustors arranged in an annular array (also referred to as a can annular combustor), and a turbine with multiple rows of rotor blades and stator vanes. An aero engine typically has an annular combustor instead of multiple can combustors arranged in an annular array as in the IGT engines.

The single largest hurdle to introducing new technologies into large frame power generation gas turbine engines is the risk that the new technology may fail during operation of the engine and result in tens of millions of dollars in equipment damage and possibly the cost of replacement electricity during the down time of the power plant. Thus, an owner of one of these engines is very reluctant to allow for the use of the engine in testing a new technology. As a result, it is very difficult to introduce new technologies into a utility power generation plant. Therefore most power generation manufacturers have test facilities to test as much as possible the components prior to going into production. Unfortunately the cost of test facilities and running the tests prohibits extensive testing and usually only allows for infant mortality issues to be discovered prior to installation of a new gas turbine engine at the utility site.

Testing a large IGT engine as a whole or testing a part or component of the engine is both very expensive and very difficult and complex. When a large engine is tested, the power generated must be dissipated. One method of dissipating the energy produced is to drive an electric generator and dump the electrical power produced. The excess electrical power produced during testing can be supplied back into the electrical grid. However, this can become a real problem with the electric power company. Since the engine testing might only last for a few hours, supplying this large amount of electricity to the grid for a few hours and then stopping causes real problems with the power company, especially if the power suddenly stops due to a problem during the test which trips the gas turbine engine offline.

Another problem with testing aero engines or large frame engines is that the cost to test is very high. In some IGT engine test beds, instead of using an electric generator to supply the resistance load, a water break or electrical heater resistors can be used to dissipate the load produced by the engine. These methods of dissipating the load have advantages over the electrical power production described above in that the disturbance to the electrical grid is not produced. However, the disadvantage is that all of the energy produced is lost.

In a power plant that uses an IGT engine to drive a generator and produce electrical power, the electrical power required by the local community cycles from high loads (peak loads) to low loads such as during cool days or at night. One process to match electric supply with demand of an electrical power plant is to make use of compressed air energy storage (CAES) system. At low loads, instead of shutting down an engine, the engine is used to drive a compressor instead of an electric generator to produce high pressure air that is then stored within an underground cavern such as a salt mine cavern. A large amount of compressed air is collected and then used to supply the engine during the peak loads.

When testing a gas turbine engine such as a large industrial engine or an aero engine or a component (such as a combustor) of one of these engines, the engine or component needs to be tested at different operating condition other than just the steady state condition. Engine partial load conditions must be tested for and therefore requires different fuel and compressed air flows. Also, the loads on the engine vary during the testing process from a full load at the steady state condition to partial loads. Thus, the amount of energy dissipated varies during the engine testing process.

Testing of a component of a large frame heavy duty industrial gas turbine engine is also required. Each of the components of an engine requires testing. The compressor, the combustor or the turbine can be tested as a separate unit from the engine. For example, in the testing of a combustor, a large volume of compressed air at high pressure (15-100 bars) is required to be supplied to the combustor to be burned with a fuel for testing. One or more compressors are required to produce this large volume of compressed air in order to recreate the actual pressure and flow produced by the compressor of the gas turbine engine that is delivered to the combustor to produce the hot gas stream passed through the turbine. Thus, a large electric motor with a power output of 20-200 MW and over is required to drive the compressor or compressors. Thus, testing of combustors requires a large capital expense and maintenance requirements.

When a component of a large industrial or aero gas turbine engine is to be tested, such as a combustor module or a turbine module or a compressor module, the entire engine is operated just to test that one component module. The entire engine is required to be operated in order to produce the conditions required to test that component module. Thus, it is very costly to test a single component module in a gas turbine engine when the entire engine is to be operated. Also, during operation of the gas turbine engine for testing one of the component modules such as a turbine module, a load is connected to the turbine in order to create a resistance during the testing process. As described above in the entire engine testing process, this load is typically lost or difficult to dissipate.

In testing of a compressor module, the compressed air produced during the testing process is wasted due to the high cost of storing the compressed air for future use. Thus, the energy produced in the testing process of a compressor module is also wasted.

An airfoil that requires a high Mach number of air flow for testing is typically supplied with compressed air from a compressed air storage tank that is relatively small and very heavy in construction to withstand the high pressures. Because of the limited size of the compressed air tank, the testing period is on the order of a few seconds which limits the accuracy of the test data and the types of data that can be measured.

Recently, several gas turbine Original Equipment Manufacturers (OEM's) have indicated a need for combustion research capability that far exceeds the flow capacity and pressure rations of existing facilities. This requirement for new combustion research facilities is motivated in the first instance by the need to design more environmentally benign gas turbines producing much reduced greenhouse gas emissions using hydrogen or, in the interim, blended hydrogen fuels. This requirement coincides with the rust-out of existing OEM combustion research facilities and the need to relocate existing facilities away from urban areas.

There is a pressing market requirement for a combustion research facility having significantly increased air mass flow rate and compression ratios than currently exist. The combustion research capacity and capability sought is necessary for next generation industrial gas turbines that will employ much higher pressure ratios than today's engines and will burn a variety of gaseous and liquid fuels with ever reducing green house gas emissions. Hydrogen produced from environmentally benign coal gasification is a key green target for the US government, based on extensive USA coal reserves and energy security agenda.

The National Research Council Institute for Aerospace Research (IAR) Gas Turbine Laboratory (GTL) already performs similar combustion research and technology demonstration. GTL R&TD is on both conventional and alternative fuels but at lower pressure ratios and air mass flow rates than are required for future technology development, demonstration and validation. The minimum facility air mass flow rate and operating pressure ratio that would be sufficient for this facility would be 150 lb/sec at a pressure ratio of 60:1. This requires a compressor drive power of 80 MW although redundancy would be a highly desirable facility attribute. The Compressor Institute design standard dictate that no more than 40 MW of compressor capacity be driven by one shaft. This means that at least two 40 MW gas turbines would be required, however, it may be prudent to use more than two drive gas turbines to enable cost effective delivery of less than one engine size class. This size test facility is estimated to cost around 200 Million. A more desirable facility capacity would provide 300-550 lb/sec of air at a minimum pressure ratio of 60:1, but would require a compressor drive capacity of around 150 MW. A full capacity facility would deliver 550 lb/sec of air at the 60:1 pressure ratio, but with a capital investment in excess of 600 Million.

Transient blow down testing is a technique that has been used for many years in aerospace testing. This technique is used to reduce the size and cost of compression and vacuum pumps required to develop the conditions required for a test. For example, a compressor can be run for days or longer to fill a tank to very high pressure and or a vacuum chamber to very low pressure. The gas is then released for testing. Depending on the mass-flow required during the test, the actual test time can vary from milliseconds up to many minutes. While the cost of the compression and vacuum equipment is kept low using the blow down facility idea, the cost of the pressure and vacuum tanks become very large. NASA Langley has some of the largest high pressure tanks available for testing to create very high Mach number flows.

SUMMARY

The present invention advantageously provides a method and system for testing a combustor or other component of a large industrial gas turbine engine. In one embodiment, a test facility to test a component of a gas turbine engine includes: a storage reservoir capable of storing enough compressed air to test a combustor of a large frame heavy duty industrial gas turbine engine for at least one hour of continuous normal operation; a heat exchanger with a first fluid flow passage connected to the storage reservoir and a second fluid flow passage, the compressed air flowing within the first fluid flow passage; a combustor connected to the second fluid flow passage of the heat exchanger, the combustor producing a hot gas stream, the hot gas stream flowing within the second fluid flow passage; and a test article connected to the second fluid flow passage of the heat exchanger, the test article being a component of a gas turbine engine. The compressed air from the storage reservoir passes through the heat exchanger first fluid flow passage and is preheated from the hot gas stream passing through the second fluid flow passage, and the preheated compressed air from the heat exchanger passes into the test article for testing.

In one embodiment, the storage reservoir is an underground cavern.

In one embodiment, the test article is a component of a large frame heavy duty industrial gas turbine engine. In one embodiment, the test article is a combustor or a turbine.

In one embodiment, the heat exchanger is a first heat exchanger, the test facility further includes a first combustor, a second heat exchanger, a second combustor, a third heat exchanger, and a third combustor, the first, second, and third heat exchangers and the first, second, and third combustors being connected in series flow.

In one embodiment, the first, second, and third heat exchangers are opposite flow heat exchangers.

In one embodiment, the system further comprises a recuperator in fluid communication with the test article, and the heat exchanger includes an outer cylinder and an inner cylinder within the outer cylinder, a space between the outer cylinder and inner cylinder forming the first fluid flow passage, and the inner cylinder forming the second fluid flow passage in fluid communication with the recuperator, the second fluid flow passage including a plurality of combustor gas flow tubes in fluid communication with the combustor.

In one embodiment, the first fluid flow passage includes a first wall formed from a high temperature resistant sheet metal, a second wall formed from a sheet metal of a less high temperature resistant sheet metal, and an insulation layer between the first wall and the second wall.

In one embodiment, the combustor gas flow tubes are formed from a high temperature resistant sheet metal.

In one embodiment, a pressure within the first fluid flow passage is approximately the same pressure as a pressure within the combustor gas flow tubes.

In one embodiment, the test article is a combustor and the test facility further includes: a recuperator located downstream of the combustor to preheat compressed air from the storage reservoir; and a water quencher located downstream of the combustor and upstream of the recuperator to cool the hot gas stream from the combustor.

In one embodiment, the test article is a combustor and the test facility further includes: an oxygen source upstream of the first heat exchanger, oxygen being added from the oxygen source to the compressed air upstream of the first heat exchanger; and a hydrogen source located upstream of the combustor, hydrogen being added to the hot gas stream upstream of the combustor being tested.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

The present invention is test facility that is used to test a component of a gas turbine engine, such as a combustor of an industrial gas turbine engine. The test facility includes an underground storage reservoir that is used to store a large volume of high pressure compressed air that will be used to test the turbine component or operate an entire gas turbine engine. As a non-limiting example, the underground storage reservoir may be large enough and configured to hold a volume of compressed air that will allow continuous testing of a large test object, such as a combustor or turbine of a large frame heavy duty industrial gas turbine engine, for at least one hour. Although testing a combustor of a gas turbine engine is discussed herein, it will be understood that the test facility may be used to test other components as well. The test facility also includes a pre-heater assembly that is used to preheat the compressed air to a temperature that would normally be used to deliver into a combustor of a gas turbine engine. The pre-heater produces preheated compressed air to simulate that from a compressor of the gas turbine engine. The preheated air from the reservoir is also non-vitiated compressed air with a normal amount of oxygen because no combustion is taking place within the compressed air that will be supplied into the test article. This more realistically simulates the compressed air from a normal compressor of that particular component that is being tested.

The flow paths shown in the figures with arrows indicate that the components connected by the arrowed flow paths are in fluid communication with each other and, therefore, that a fluid (e.g., gas or liquid) may pass between components as described herein.

Figure 1:
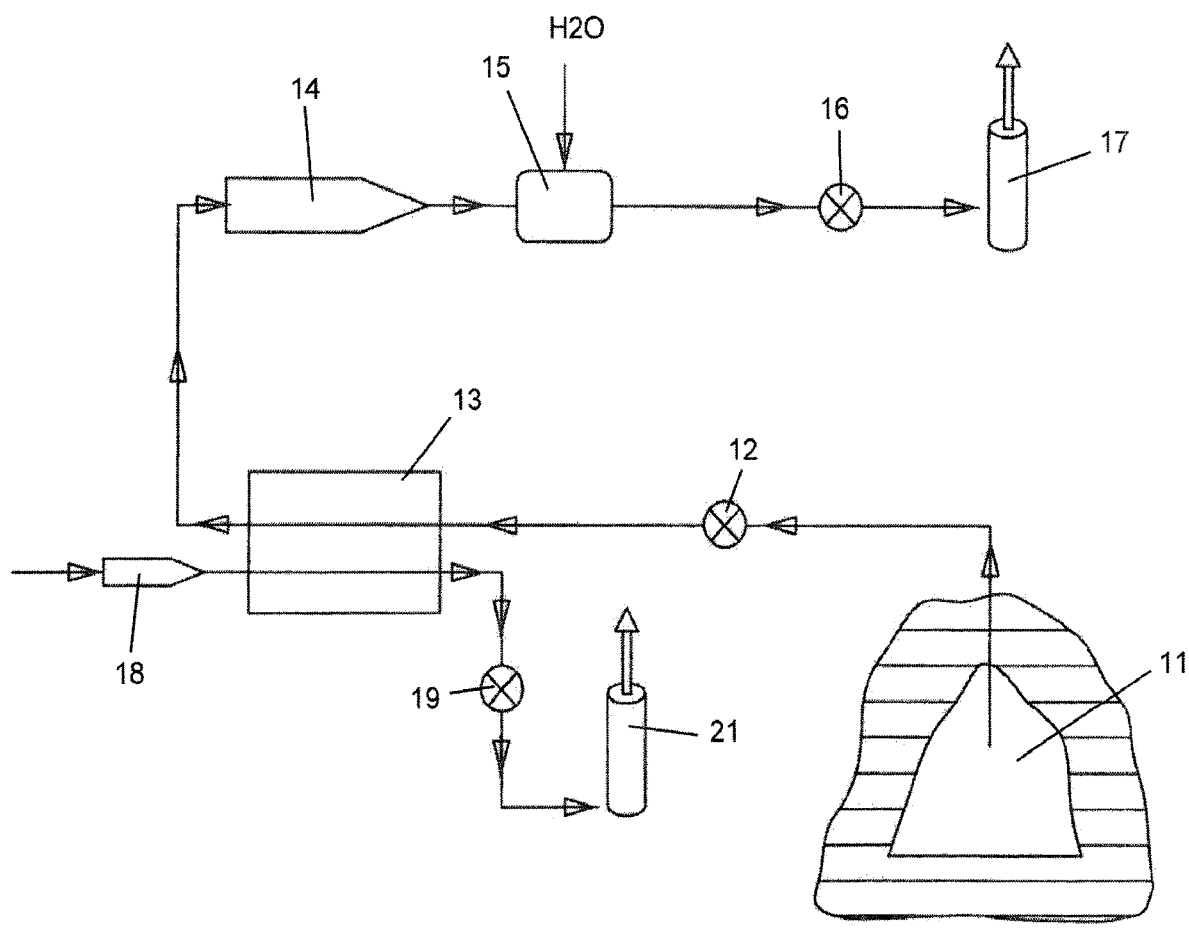
FIG. 1 shows a diagram view of testing facility for a combustor test article of a first embodiment of the present invention.

FIG. 1 shows one embodiment of a test facility that is used to test a gas turbine engine component such as a combustor. A compressed air storage unit or underground storage reservoir 11, such as an underground salt cavern, is used to store compressed air. In this embodiment, the stored compressed air is at a pressure of around 75 bar (1 bar being ambient or atmospheric pressure) and a temperature of 120° F. maximum. The compressed air storage reservoir 11 is connected to a heat exchanger 13 through a conduit or pipe with a regulator valve 12. From the heat exchanger 13, the compressed air is passed into a combustor test article 14 where a fuel is injected and burned with the compressed air to produce a hot gas stream. The hot gas stream from the combustor 14 is quenched with water using a water quencher 15 (also referred to as an "H$_2$O quencher"). The cooled hot gas stream is then discharged out through an exhaust stack 17. A second regulator valve 16 is used to regulate the pressure in the line between the water quencher 15 and the exhaust stack 17.

The compressed air from the storage reservoir 11 is preheated in the heat exchanger 13 using a combustor 18 that burns a fuel, such as natural gas, to produce a hot gas stream that is passed through the heat exchanger 13 to preheat the compressed air prior to discharge into the combustor test article 14. For example, the heat exchanger 13 may include a first fluid flow passage through which compressed air from the storage reservoir 11 flows and a second fluid flow passage through which the hot gas stream from the combustor 18 flows, the first and second fluid flow passages flowing opposite and being in thermal exchange with each other. The hot gas from the combustor 18 is discharged through a second exhaust stack 21 but could also be discharged from the main exhaust stack 17. A third regulator valve 19 is used to regulate the pressure in the line between the heat exchanger 13 and the exhaust stack 21. In the FIG. 1 embodiment, the compressed air from the reservoir 11 suffers no loss of oxygen during the preheating process which is then supplied to the test article to simulate a compressed air that would be supplied from a compressor (that is, the preheater 13 is a non-vitiating heater).

In the FIG. 1 embodiment, compressed air flows from the storage reservoir 11 at around 420 lbm/second and into the heat exchanger 13 to be preheated to 1,330° F. at 70 bar prior to entry into the combustor test article 14. The preheated compressed air is at a temperature that does not require further heating for use in the combustor test article.

Figure 2:
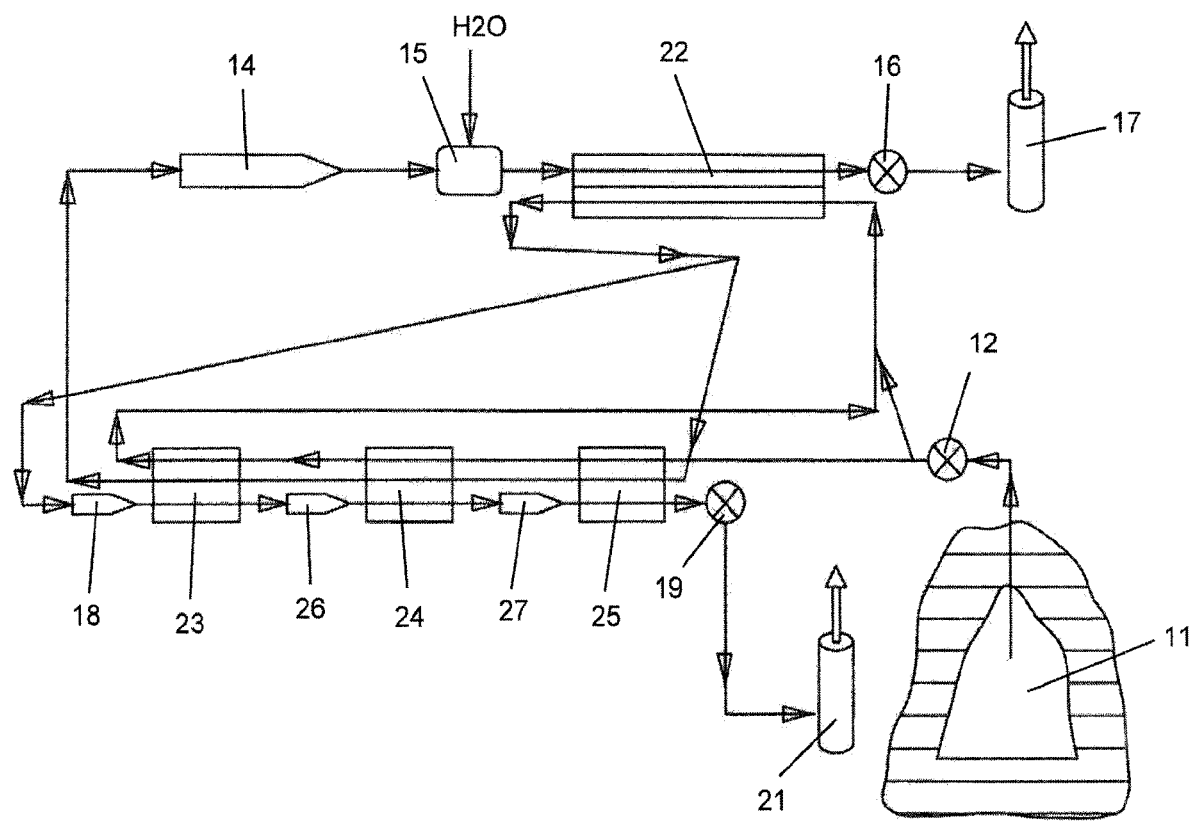
FIG. 2 shows a diagram view of testing facility for a combustor test article of a second embodiment of the present invention with a series of three combustors and three heat exchangers along with a preheat recuperator.

FIG. 2 shows a second embodiment of the present invention in which the compressed air is further heated to a temperature of around 1,530° F. prior to discharge into the combustor test article 14. The FIG. 2 embodiment includes a first combustor 18 and a first heat exchanger 23, a second combustor 26 and a second heat exchanger 24, and a third combustor 27 and a third heat exchanger 25. The first 18, second 26, and third 27 combustors and first 23, second 24, and third 25 heat exchangers are connected in series flow as shown in FIG. 2. Further, each of the heat exchangers 23, 24, 25 are opposite flow heat exchangers, wherein a first fluid flow within the heat exchanger is in a direction opposite a second fluid flow within the heat exchanger. For example, as described for the heat exchanger 13 in FIG. 1, the heat exchangers 23, 24, 25 include a first fluid flow passage through which compressed air from the storage reservoir 11 flows and a second fluid flow passage through which the hot gas stream from the combustor 18 flows, the first and second fluid flow passages flowing opposite and being in thermal exchange with each other. The second embodiment also includes a preheat recuperator 22 to use the combustor test article exhaust to preheat the compressed air from the storage reservoir 11. A major benefit of the three heat exchangers 23, 24, 25 arranged in series flow is that the hot gas flow pressure loss is high, which promotes a higher heat transfer rate within the heat exchangers and therefore a significantly smaller heat exchanger. The smaller heat exchanger will be much less costly than with heat exchangers that have low pressure loss.

Compressed air at 80 bar and 120° F. (max temperature) is passed through the first 23, second 24, and third 25 heat exchangers through an outer passage to be preheated. This preheated compressed air is then passed through the preheat recuperator 22 to add additional heat using the combustor test article 14 exhaust. Some of the preheated compressed air is diverted and passed into the first combustor 18 to produce a hot gas stream that is then passed through the heat exchangers 23, 24, 25 which is then passed through the first 18, second 26, and third 27 combustors and first 23, second 24, and third 25 heat exchangers to preheat the compressed air from the storage reservoir 11.

The preheated compressed air from the preheat recuperator 22 that is not diverted into the first combustor 18 is passed through the three heat exchangers 23, 24, 25 through inner passages described below. This further heats the compressed air prior to discharge into the combustor test article 14. The exhaust from the combustor test article 14 is cooled with water in the quencher 15 and then passed through the preheat recuperator 22 to preheat the compressed air from the storage reservoir 11. The exhaust from the preheat recuperator 22 is then discharged out the exhaust stack 17.

Figure 6:
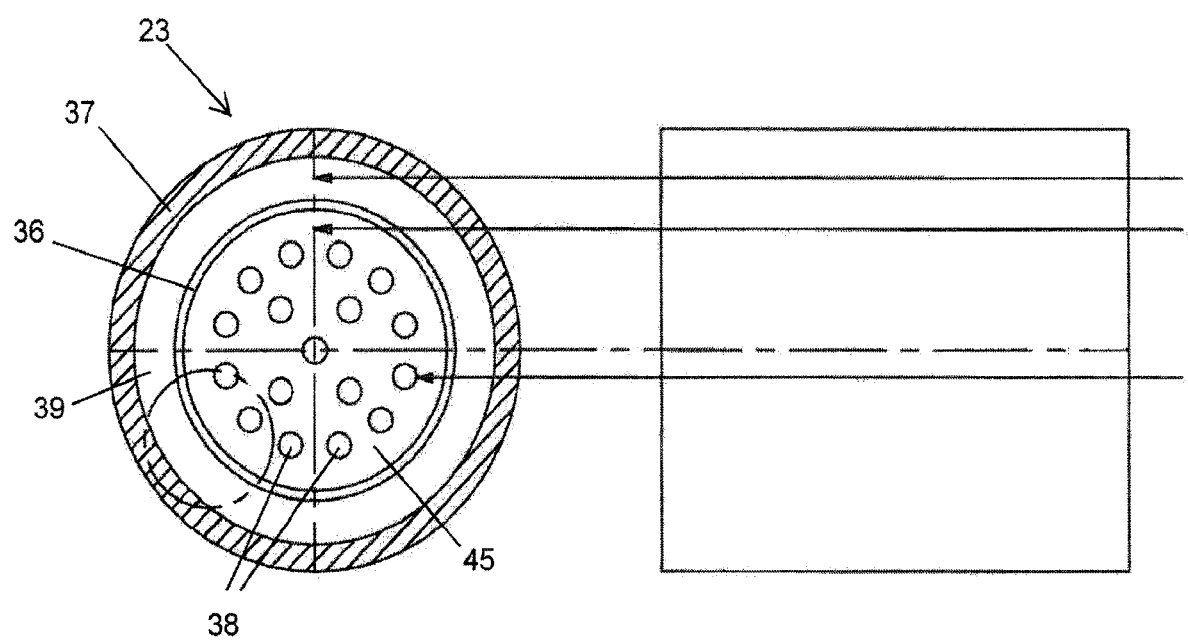
FIG. 6 shows a cross section front view alongside a side view of one of the heat exchangers used to preheat the compressed air.
Figure 7:
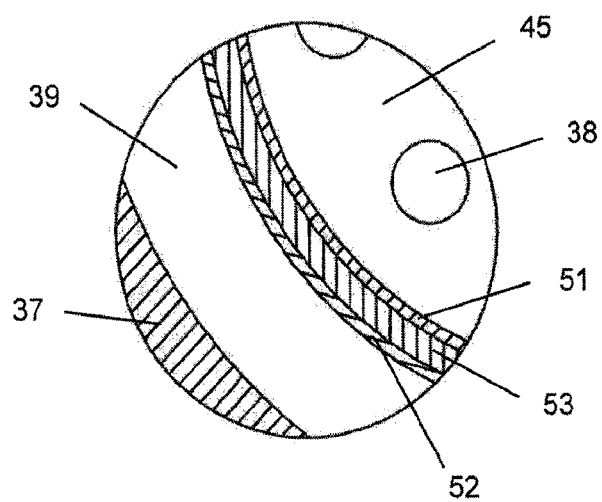
FIG. 7 shows a close-up view of a section of the heat exchanger represented by the circle in FIG. 6.

Details of the structure and operation of each of the three heat exchangers 23, 24, 25 can be seen from FIGS. 6 and 7. FIG. 6 shows a cross section front view along the axis of one of the first 23, second 24, and third 25 heat exchangers on the left side and a side view on the right side. FIG. 7 shows a close-up view of the encircled portion of FIG. 6. Each heat exchanger 23, 24, 25 includes an outer cylinder 37 surrounding an inner cylinder 36 with a space therebetween (for example, the outer cylinder 37 has a larger diameter than the inner cylinder 36), such that the outer cylinder 37 and inner cylinder 36 together define an outer passage 39. The inner cylinder 36 forms an inner passage 45. The outer cylinder 37 functions as a pressure vessel in that the pressures of the outer passage 39 and the inner passage 45 can both be high, for example, around 70 or 80 bar. The inner passage 45 includes a number of combustor gas tubes 38 that carry the hot gas produced by the combustors 18, 26, 27. The preheated compressed air from the preheat recuperator 22 is passed through the inner passage 45 surrounding the combustor gas tubes 38. The unheated compressed air from the storage reservoir 11 is passed through the outer passage 39 prior to entry into the preheat recuperator 22 that functions both to preheat the compressed air and to cool the heat exchangers 23, 24, 25. If a recuperator 22 is not used, the compressed air from the storage reservoir 11 is passed through both the outer passage 39 and the inner passage 45 before flowing to the test article 14. If the pressure of the inner passage 45 is approximately the same as the pressure in the combustor gas tubes 38 (for example, ±10 bar), the heat transfer rate is very high because the velocity of the two gas flows are high. In a prior art heat exchanger such as one that uses natural gas to produce the hot gas stream at near ambient pressure (1 bar) and a cooler passage that is to be heated at a high pressure (100 bar), the heat transfer rate from the hot gas stream to the cool gas stream is low. Also, high stress levels are formed in the hot gas tubes that reduce the service life of the heat exchanger. By equalizing the pressures of the hot gas stream and the low gas stream in the heat exchanger, the heat transfer rate can be significantly increased, and thus a smaller and cheaper heat exchanger can be formed. Further, when the two pressures are close together, the stress level is low and thus the heat exchanger can have a longer service life. Also, allowing for the hot gas flow to have a large decrease in pressure from the inlet end to the outlet end will also increase the heat transfer rate from the hot gas to the cooler gas flow in the heat exchanger 13 (or heat exchangers 23,24,25) or recuperator 22. For the recuperator 22, initial analysis shows the best heat transfer rate to occur when the cooled gas flow enters at 70 bar and exits at 69 bar while the hotter gas flow enters at 70 bar and exits at 30 bar.

The two high pressure streams in the outer passage 39 and the inner passage 45 provide a pressure balance between the inner cylinder 36 and outer cylinder 37. The outer cylinder 37 becomes a pressure vessel that allows for high pressures in the inner and outer passages so that thinner tubes can be used to increase a heat transfer rate, decrease the cost and to increase the service life of the heat exchanger. By doing so, we are able to use inexpensive steel for the pressure vessel material while utilizing a thin sheet of metal, such as HAYNES® 230® (Haynes International, Inc., Kokomo, Ind.), to define a first wall 51 that contains the innermost heat exchanger (i.e., inner passage 45 and combustor gas tubes 38). The outermost stream 39 is preheated in the heat exchanger and then passes through the inner passage 45 which surrounds the individual hot combustor gas tubes 38. The first wall 51 can either be insulated or un-insulated. The first wall 51 is thin and has weep holes to allow a second wall 52, which may be composed of a less expensive material (for example, a sheet of AISI 4340 alloy steel), to withstand a small pressure difference between the outer passage 39 and inner passage 45. Due to this design, the more expensive material with a higher heat transfer rate can be used in a cost effective manner.

The three heat exchangers 23, 24, 25 are each made with materials that can withstand the temperatures so that the preheated compressed air that enters the combustor test article 14 will have the proper temperature in order to recreate that temperature produced by a compressor of the gas turbine engine. As discussed above, the inner cylinder 36 includes a first cylindrical wall 51 composed of a high temperature resistant material, such as HAYNES® 230® sheet metal and a second cylindrical wall 52 composed of, for example, AISI 4340 alloy steel sheet metal with an insulation layer 53 between the first 51 and second 52 walls, such as microtherm insulation shown in FIG. 7. The combustor gas tubes 38 are also made from a high temperature resistant material, such as the HAYNES® 230® sheet metal. To allow for very thin sheet of the HAYNES® 230® material, a pressure difference between the outer passage 39 and the inner passage 45 is at a minimum. Weep holes or pressure equalization holes are formed in the inner cylinder 36 that connect the outer passage 39 to the inner passage 45 so that the pressure difference is minimized and so that very little flow through the weep holes occur. The weep holes allow for pressure equalization with a minimal amount of cross-over flow. The HAYNES® 230® sheet material is very expensive and thus the present invention seeks to minimize the cost of the heat exchangers. By keeping the pressure difference between the outer passage 39 and the inner passage 45 at a minimum, the thickness of the HAYNES® 230® cylinder sheets can also be at a minimum. Also, use of the high temperature resistant HAYNES® 230® sheet metal allows for the high temperature gas stream to reach the high temperature required for reproducing the compressor outlet temperature in a gas turbine engine.

In one embodiment of the present invention, the three heat exchangers 23, 24, 25 will have these specifications. The outer cylinder 37 will be composed of AISI 4340 pressure vessel material with an inner diameter of 32 inches and a wall thickness of 0.500 inches. The inner cylinder 36 will be formed from a cylindrical first wall 51 composed of a sheet of HAYNES® 230® sheet metal with an inner diameter of 28 inches and a thickness of 0.065 inches, and a second cylindrical wall 52 composed of AISI 4340 sheet material with an inner diameter of 28.88 inches and a thickness of 0.065 inches. The microtherm insulation 53 has a thickness of 0.375 inches. The combustor gas tubes 38 are made from HAYNES® 230® material with an inner diameter of 0.190 inches and a thickness of 0.065 inches. In the FIGS. 2 and 3 embodiments, the three heat exchangers 23, 24, 25 have different lengths. In the preferred embodiment, the first heat exchanger 23 has an axial length of 50 feet, the second heat exchanger 24 has an axial length of 75 feet, and the third heat exchanger 25 has an axial length of 100 feet. In operation, the three heat exchangers 23, 24, 25 have a pressure differential of 75 bars delta between the outer passage 39 and outside of the outer cylinder 37.

The preheat recuperator and inline combustors and heat exchangers in the FIG. 2 embodiment operates as follows. Compressed air at around 80 bar and at 120° F. (max temperature) with a flow rate of around 540 lbm/second is passed through the outer passages 39 of each of the three heat exchangers 23, 24, 25 to be preheated by the hot gas flow passing through the heat exchangers. The preheated compressed air from the three heat exchangers 23, 24, 25 then is passed through the preheat recuperator 22 to pick up additional heat and exits the recuperator 22 at around 1,150° F. Most of the preheated compressed air from the recuperator 22 is then passed through the inner passage 45 of the three heat exchangers 23, 24, 25 to add additional heat to the compressed air from the combustor gas flow passing through the three combustors 18, 26, 27 passing through the combustor gas tubes 38. The preheated compressed air then exits the last heat exchanger 23 at a temperature of around 1,530° F., a pressure of around 70 bar, and a flow of around 420 lbm/second, and is then discharged into the combustor test article 14. The heated combustor test article gas is then discharged into a water quencher 15 for cooling prior to passing through the recuperator 22 and then out through the exhaust stack 17. Cooling of the hot gas from the test article 14 is required prior to passing through the recuperator 22 if the test article is a combustor, since the combustor exhaust gas flow temperature would be too high for the materials that form the recuperator 22. Some of the preheated compressed air from the recuperator 22 is diverted into the first combustor 18 having a temperature of around 1,150° F. with a flow rate of around 120 lbm/second. This diverted compressed air is then passed through the series of combustors 18, 26, 27 that add heat in series to transfer into the preheated compressed air passing through the inner passages 45.

Figure 3:
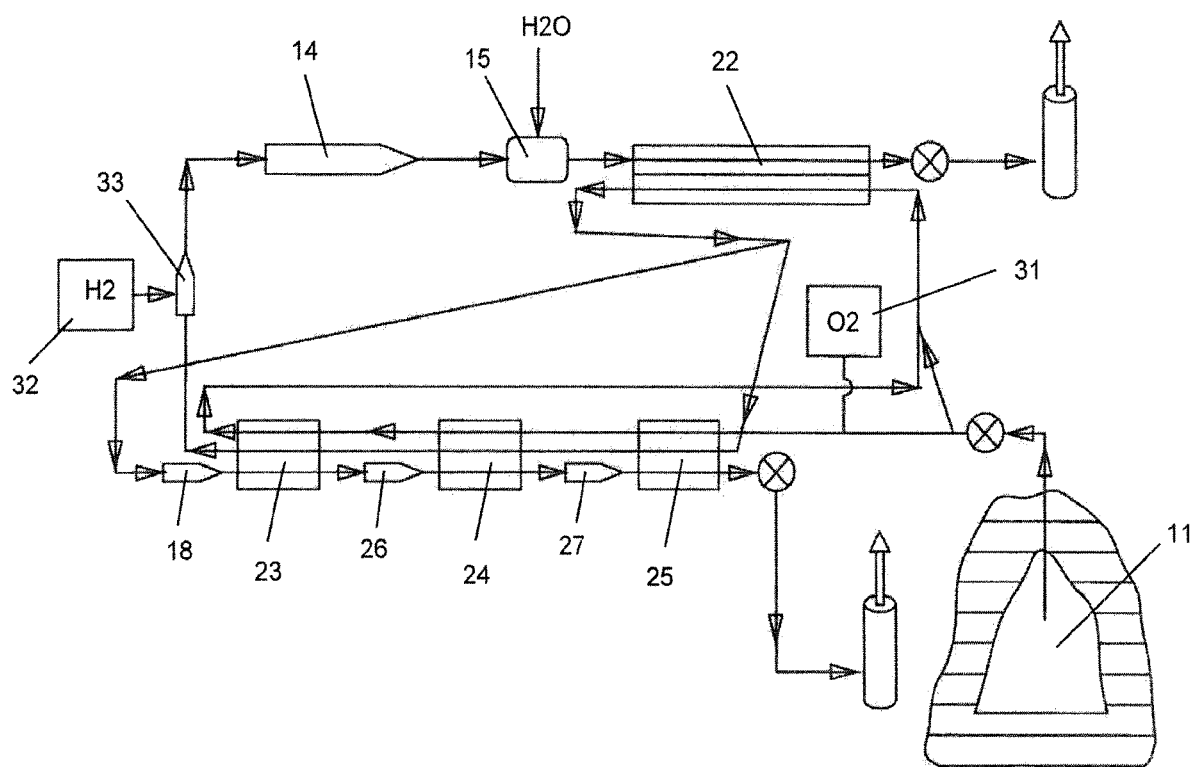
FIG. 3 shows a diagram view of testing facility for a combustor test article of a third embodiment of the present invention with the FIG. 2 configuration with an additional combustor to preheat the compressed air.

FIG. 3 shows a third embodiment of the present invention in which oxygen is added to the compressed air from the storage reservoir 11 and then burned with hydrogen in a combustor just upstream from the combustor test article 14 to further increase the compressed air temperature. A source of oxygen 31 is connected to the compressed air line between the storage reservoir 11 and the heat exchanger 25 to inject oxygen into the compressed air flow. A source of hydrogen 32 is located upstream of the combustor 33 to burn the hydrogen with the oxygen contained within the compressed air flow to further heat the compressed air prior to entry into the combustor test article 14. The purpose is to recreate the conditions from a compressor output that would normally be used to supply the pressurized air to a combustor for burning with a fuel to produce a hot gas stream for the turbine in the gas turbine engine.

Figure 4:
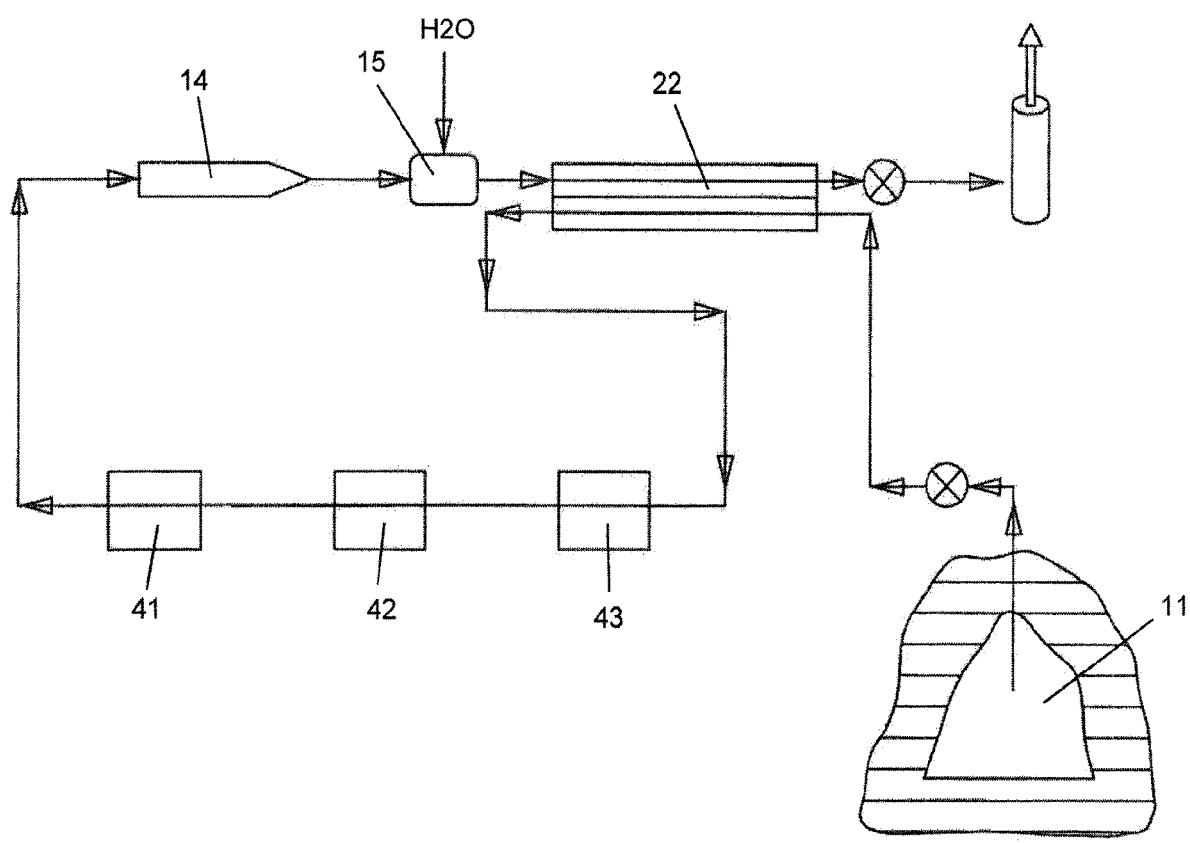
FIG. 4 shows a diagram view of testing facility for a combustor test article of a fourth embodiment of the present invention with a series of three electric heaters.

The FIG. 4 embodiment shows a preheat recuperator 22 with a first electric heater 41, a second electric heater 42, and a third electric heater 43 connected in series to preheat the compressed air from the recuperator 22 prior to discharge into the combustor test article 14. In this embodiment, compressed air from the storage reservoir 11 flows at 420 lbm/second at 75 bar and a maximum temperature of 120° F. and into the recuperator 22 to be preheated to 1,150° F. The preheated compressed air then passes through the three electric heaters 42, 42, 43 to be preheated to 1,530° F. at 70 bar and 420 lbm/second flow rate prior to discharge into the combustor test article 14. The exhaust from the combustor test article 14 is then passed through the recuperator 22 to be used for preheating the compressed air from the storage reservoir 11 and then is discharged through the exhaust stack 17.

Figure 5:
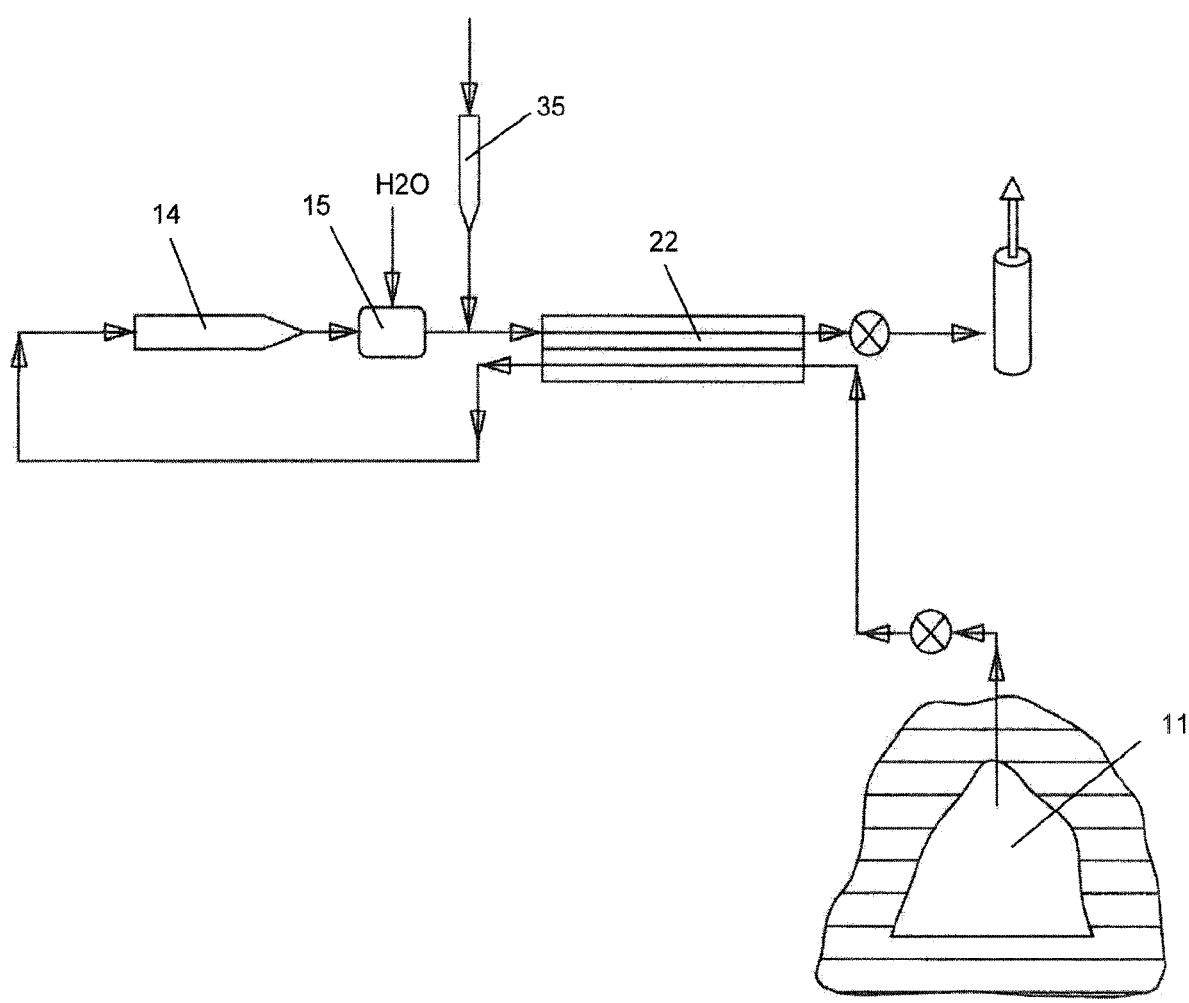
FIG. 5 shows a diagram view of testing facility for a combustor test article of a fifth embodiment of the present invention with a preheat recuperator only.

FIG. 5 shows an embodiment of the present invention with a preheat recuperator 22 only. Compressed air from the storage reservoir 11 is passed through the recuperator 22 to be preheated and then passed directly into the combustor test article 14. A water quencher 15 is used to cool the combustor test article 14 discharge gas flow. A duct burner 35 is used during startup to preheat the gas flow flowing through the recuperator 22 until the combustor test article 14 exhaust gas flow is hot enough to preheat the compressed air from the storage reservoir 11. In the FIG. 5 embodiment, the compressed air flowing out from the recuperator 22 will have a flow rate of 420 lbm/second at 1,530° F. and a pressure of 70 bar. The duct burner 35 is to be used in a combustor test facility configuration to provide a heated air source for a downstream recuperator 22, allowing for preheated air from a pressurized storage area 11 to be delivered to a combustor test article 14 at an elevated temperature during startup. Once the combustor test article 14 is ignited, the duct burner 35 can either be used in a feedback loop to augment recuperator inlet temperature and flow rate to the recuperator 22, or alternatively the duct burner 35 can be turned off during combustor test article 14 operation.

Figure 8:
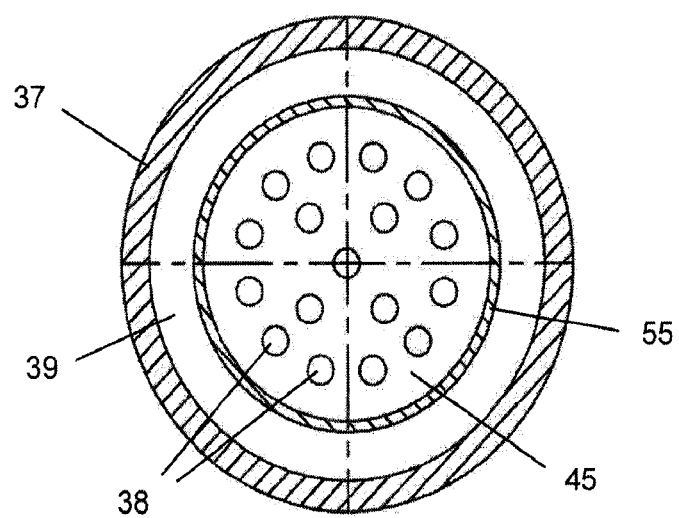
FIG. 8 shows a cross section front view of a second embodiment of the heat exchanger with a solid inner cylinder.

FIG. 8 shows a second embodiment of the heat exchangers 23, 24, 25 used in the FIGS. 2 and 3 embodiments. Instead of an inner cylinder having two cylindrical walls 51 and 52 with an insulation later in-between, the FIG. 8 embodiment uses a single cylindrical wall 55 composed of, for example, a sheet of HAYNES® 230® material.

Figure 9:
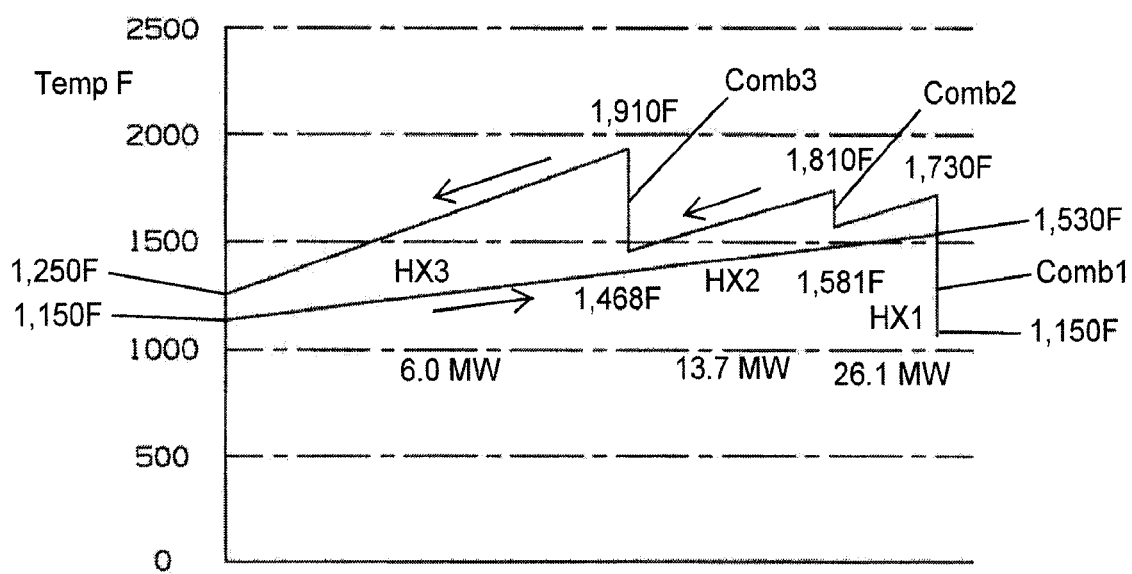
FIG. 9 shows a graph of the temperatures of the flow of compressed air and the preheat air used in the FIG. 2 embodiment of the testing facility.

FIG. 9 shows a graph of the increases in the temperature of the compressed air for the FIG. 2 embodiment with the three heat exchangers 23, 24, 25 and the preheat recuperator 22 that are both used to preheat the compressed air from the storage reservoir 11. The top line on the graph with the zig-zag shape represents the hot gas flow through the three combustors 18, 26, 27 and the three heat exchangers 23, 24, 25 that is used to preheat the compressed air flow from the storage reservoir 11. The air flow enters the series of combustors 18, 26, 27 and heat exchangers 23, 24, 25 on the right side of the graph at 1,150° F., and is heated to 1,730° F. in the first combustor 18, then cools to 1,581° F. in the first heat exchanger 23, then is heated to 1,810° F. in the second combustor 26, cooled to 1,468° F. in the second heat exchanger 24, then heated to 1,910° F. in the third combustor 27 and cooled to 1,250° F. in the third heat exchanger 25.

The bottom line on the graph with the straight and upward sloping shape represents the compressed air flow from the storage reservoir 11. The compressed air flow enters the series of combustors 18, 26, 27 and heat exchangers 23, 24, 25 on the left side of the graph at 1,150° F. and exits at 1,530° F. as the delivery temperature into the combustor test article 14. The first heat exchanger 23 adds 26.1 MW of energy to the compressed air flow, the second heat exchanger 24 adds 13.7 MW, and the third heat exchanger 25 adds 6.0 MW of energy. With the addition of the burner 33 in the FIG. 3 embodiment, the compressed air entering to the combustor test article 14 will be preheated to 1,630° F.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A test facility to test a component of a gas turbine engine, the test facility comprising:
   a storage reservoir capable of storing enough compressed air to test a component of a gas turbine engine for at least one hour of continuous normal operation;
   a first heat exchanger with a first fluid flow passage connected to the storage reservoir and a second fluid flow passage, the compressed air flowing within the first fluid flow passage;
   a first combustor connected to the second fluid flow passage of the first heat exchanger, the first combustor producing a hot gas stream, the hot gas stream flowing within the second fluid flow passage; and
   a test article connected to the first fluid flow passage of the first heat exchanger, the test article being the component of a gas turbine engine,
   the compressed air from the storage reservoir passing through the first fluid flow passage of the first heat exchanger and being preheated from the hot gas stream passing through the second fluid flow passage of the first heat exchanger, and the preheated compressed air from the first heat exchanger passing into the test article for testing;
   a second heat exchanger;
   a second combustor;
   a third heat exchanger; and
   a third combustor, the first, second, and third heat exchangers and the first, second, and third combustors being connected in series flow.

2. The test facility of claim 1, wherein the test article is a combustor of a large frame heavy duty industrial gas turbine engine.

3. The test facility of claim 1, wherein the test article is a compressor or a turbine.

4. The test facility of claim 1, wherein the storage reservoir is an underground cavern.

5. The test facility of claim 1, wherein the first, second, and third heat exchangers are opposite flow heat exchangers.

6. The test facility of claim 1, wherein the test article is a combustor, the test facility further comprising:
   a recuperator located downstream of the combustor to preheat compressed air from the storage reservoir; and
   a water quencher located downstream of the combustor and upstream of the recuperator to cool the hot gas stream from the combustor.

7. The test facility of claim 1, wherein the test article is a combustor, the test facility further comprising:
   an oxygen source upstream of the first heat exchanger, oxygen being added from the oxygen source to the compressed air upstream of the first heat exchanger; and
   a hydrogen source located upstream of the first combustor, hydrogen being added to the hot gas stream upstream of the combustor being tested.

8. The test facility of claim 1, further comprising a recuperator in fluid communication with the test article, wherein the heat exchanger includes:
   an outer cylinder; and
   an inner cylinder within the outer cylinder, a space between the outer cylinder and inner cylinder forming the first fluid flow passage, and the inner cylinder forming the second fluid flow passage in fluid communication with the recuperator,
   the second fluid flow passage including a plurality of combustor gas flow tubes in fluid communication with the combustor.

9. The test facility of claim 8, wherein the inner cylinder includes:
   a first wall formed from a high temperature resistant sheet metal;
   a second wall formed from a sheet metal of a less high temperature resistant sheet metal; and
   an insulation layer between the first wall and the second wall.

10. The test facility of claim 8, wherein the combustor gas flow tubes are formed from a high temperature resistant sheet metal.

11. The test facility of claim 8, wherein a pressure within the first fluid flow passage is approximately the same pressure as a pressure within the combustor gas flow tubes.

12. A test facility to test a component of a gas turbine engine, the test facility comprising:
   a storage reservoir (11) capable of storing enough compressed air to test a combustor of a large frame heavy duty industrial gas turbine engine for at least one hour of continuous normal operation;
   a first heat exchanger (23) and a first combustor (18);
   a second heat exchanger (24) and a second combustor (26);
   a third heat exchanger (25) and a third combustor (27);
   each of the three heat exchangers (23, 24, 25) having an outer cylinder (37) forming a pressure vessel wall, an inner cylinder (36) forming an outer passage (39) with the outer cylinder (37), an inner passage (45) contained within the inner cylinder (36) and a plurality of combustor gas tubes (38) passing through the inner cylinder (36);
   the first heat exchanger (23), the second heat exchanger (24), and the third heat exchanger (25) being connected in series;
   the outer passages (39) of the third heat exchanger (25) being connected to the storage reservoir (11);

an outlet of the outer passage (39) of the first heat exchanger (23) being connected to each of the inner passage (45) of the third heat exchanger (25) and an inlet of the first combustor (18);

the first combustor (18) being connected to an inlet of the combustor gas tubes (38) of the first heat exchanger (23);

the second combustor (26) being connected to an inlet of the combustor gas tubes (38) of the second heat exchanger (24);

the third combustor (27) being connected to an inlet of the combustor gas tubes (38) of the third heat exchanger (25);

an outlet of the inner passage of the first heat exchanger (23) being connected to a test article (14), the test article (14) being a component of a gas turbine engine or a component of a gas turbine engine such as a combustor; and the compressed air from the storage reservoir (11) passing through the outer passages (39) of the three heat exchangers (23, 24, 25) and being preheated from the hot gas stream passing through the inner passages (45) of the three heat exchangers (23, 24, 25), and the preheated compressed air from the inner passages (45) of the three heat exchangers (23, 24, 25) passing into the test article (14) for testing.

13. The test facility of claim 12, further comprising:

a preheat recuperator (22) with a first passage for heated compressed air and a second passage for hot exhaust gas, wherein the first passage is connected to the inner passage (45) of the third heat exchanger (25) and the second passage is connected to a discharge of the test article (14).

14. The test facility of claim 12, wherein:

the outer cylinder (37) of each of the three heat exchangers (23, 24, 25) functions as a pressure vessel for a pressure of at least 70 bar.

15. The test facility of claim 12, wherein:

a pressure in the inner passages (45) of the three heat exchangers (45) is within plus or minus 10 bar of a pressure in the combustor gas tubes (38).

16. The test facility of claim 12, wherein:

the third heat exchanger (25) has a length greater than the second heat exchanger (24); and the second heat exchanger (24) has a length greater than the first heat exchanger (23).

\* \* \* \* \*